US008773170B2

(12) United States Patent
Williams

(10) Patent No.: US 8,773,170 B2
(45) Date of Patent: Jul. 8, 2014

(54) COUPLING TOLERANT PRECISION CURRENT REFERENCE WITH HIGH PSRR

(75) Inventor: Brian Williams, Melbourne, FL (US)

(73) Assignee: Intersil Americas Inc., Milpitas, CA (US)

(*) Notice: Subject to any disclaimer, the term of this patent is extended or adjusted under 35 U.S.C. 154(b) by 0 days.

(21) Appl. No.: 13/049,673

(22) Filed: Mar. 16, 2011

(65) Prior Publication Data

US 2011/0241734 A1 Oct. 6, 2011

Related U.S. Application Data

(60) Provisional application No. 61/321,079, filed on Apr. 5, 2010.

(51) Int. Cl.
*H02M 11/00* (2006.01)
*G05F 1/56* (2006.01)

(52) U.S. Cl.
CPC .................................... *G05F 1/561* (2013.01)
USPC .......................................................... 327/103

(58) Field of Classification Search
USPC ........................... 327/50–52, 54, 56, 77, 103
See application file for complete search history.

(56) References Cited

U.S. PATENT DOCUMENTS

| | | | | |
|---|---|---|---|---|
| 5,291,123 | A | 3/1994 | Brown | |
| 7,109,794 | B2 * | 9/2006 | Killat | 330/253 |
| 2002/0196069 | A1 * | 12/2002 | Tanaka | 327/362 |
| 2010/0060345 | A1 | 3/2010 | Huang et al. | |
| 2010/0156533 | A1 * | 6/2010 | Tachibana et al. | 330/253 |

FOREIGN PATENT DOCUMENTS

| | | | |
|---|---|---|---|
| CN | 1780123 | A | 5/2006 |
| CN | 101133374 | A | 2/2008 |
| CN | 101645650 | A | 2/2010 |

OTHER PUBLICATIONS

Amendment dated Apr. 4, 2014, in Chinese Patent Application No. 201110096074.6 filed Aug. 19, 2011.
Office Action dated Feb. 8, 2014, in Chinese Patent Application No. 201110096074.6 filed Aug. 19, 2011.

* cited by examiner

*Primary Examiner* — Sibin Chen
(74) *Attorney, Agent, or Firm* — Vierra Magen Marcus LLP

(57) ABSTRACT

Embodiments of the present invention are related to circuits and methods for generating a reference current (Idc). In an embodiment, a voltage-to-current converter circuit is used to generate the reference current (Idc) in dependence on a reference voltage (Vref) and a precision resistor (R0), wherein Idc=Vref/R0. A capacitor (C0) is used to shunt noise that couples into the voltage-to-current converter. A frequency dependent feedback network is used to compensate for instabilities introduced by the capacitor (C0). The capacitor (C0) can be used to shunt noise that couples into the voltage-to-current converter by connecting the capacitor (C0) in parallel with the precision resistor (R0). The frequency dependent feedback network can be used to compensate for instabilities introduced by the capacitor (C0) by connecting the frequency dependent feedback network between a feedback terminal of an amplifier of the voltage-to-current converter circuit and a terminal of the capacitor (C0).

20 Claims, 7 Drawing Sheets

300

COUPLING TOLERANT PRECISION CURRENT REFERENCE WITH HIGH PSRR

PRIORITY CLAIMS

This application claims priority under 35 U.S.C. 119(e) to U.S. Provisional Patent Application No. 61/321,079, entitled COUPLING TOLERANT PRECISION CURRENT REFERENCE WITH HIGH PSRR, which was filed Apr. 5, 2010, and which is incorporated herein by reference.

BACKGROUND

Many types of integrated circuits require a precision current reference. Such a precision current reference is often generated using a voltage-to-current (V-I) converter, examples of which are shown in and described with reference to FIGS. 1A-1C and 2. In these FIGS., examples of circuits that require a precision reference current are shown generically as a load that is labeled Z_load.

In FIG. 1A, the non-inverting (+) input of an amplifier AMP receives a reference voltage Vref. The output of the amplifier AMP drives the gate of an NMOS transistor M1. The inverting (−) input of the amplifier AMP (e.g., an operation amplifier) is connected to the source of the transistor M1. A precision resistor R_precision is connected between the source of the transistor M1 and ground (gnd). A load Z_Load is connected between a supply voltage Vsupply and the drain of the transistor M1. Examples of the load Z_load include, but are not limited to, a resistor, a current mirror input, a reference for a digital-to-analog converter (DAC), a reference for an analog-to-digital converter (ADC), and a capacitor that is used to generate a ramp voltage.

In FIG. 2, the inverting (−) input of an amplifier AMP receives the reference voltage Vref. The output of the amplifier AMP drives the gate of a PMOS transistor M2. The non-inverting (+) input of the amplifier AMP is connected to the drain of the transistor M2. A precision resistor R_precision is connected between the drain of the transistor M2 and ground (gnd). The load Z_Load is connected between the supply voltage Vsupply and the source of the transistor M2.

The circuits of FIGS. 1A and 2 both copy the reference voltage Vref to a precision resistor R_precision using the high gain voltage amplifier AMP in a unity gain buffer configuration. The precision resistor R_precision is used to specify a magnitude of the reference current. The resulting current, which flows through the precision resistor R_precision flows through the pass transistor device, M1 or M2, into the load Z_Load. The circuit in FIG. 2 has advantages for certain applications; however it has poor supply rejection because any perturbation of the supply voltage Vsupply directly modulates the gate-to-source voltage of the transistor M2 and causes a current change in the load Z_Load. Because of this, for applications that require a high power supply rejection ratio (PSRR), the circuit of FIG. 1A is often preferred.

The V-I circuit shown in FIG. 1A makes for an excellent precision current reference, as the only error source is the offset voltage of the amplifier AMP (e.g., an operation amplifier) and the tolerance of the precision external resistor R_precision. However, a real world problem with the circuit of FIG. 1A can be appreciated from FIG. 1B. Referring to FIG. 1B, the AMP, the transistor M1 and the load Z_Load are shown as being within an integrated circuit (IC) package (an IC package can also be referred to as a chip). The precision resistor R_precision is shown as being located outside the IC package on a printed circuit (PC) board, and connected to the IC package (and more specifically, to the source of the transistor M1) by a package pin. Because the precision resistor R_precision is on the PC board and not in the IC package, there is the possibility of an adjacent pin and/or a nearby signal capacitively coupling noise or spurs into the V-I circuit and causing errors. For instance, if there were a high speed comparator comparing the voltage at the drain of the transistor M1 to another signal on the chip, a coupled signal into the package pin could trip the comparator. For another example, if the reference were used as the reference current for an analog-to-digital converter (ADC) or a digital-to-analog converter (DAC), the coupled noise could show up as a degradation in the effective number of bits. In FIG. 1B, the coupled noise is modeled as a voltage source V0, and a parasitic capacitance is modeled as a capacitor C_parasitic. Such a parasitic capacitance can occur, e.g., due to a pin to pin capacitance of the package and/or a trace to trace capacitance on the PC board.

It is also noted that digital signals which swing from the minus supply to the positive supply very rapidly and signals which switch large currents (e.g., the output of a switch mode power supply or a gate driver) can cause a problem when coupled back into the chip.

There is a need to reject the noise coupled into the package pin, which is complicated by the fact that the coupled noise is indistinguishable from a change in the precision resistor R_precision, and the feedback of the amplifier AMP forces all the current injected through the parasitic capacitance to flow into the load Z_load.

SUMMARY

Figure 3A:
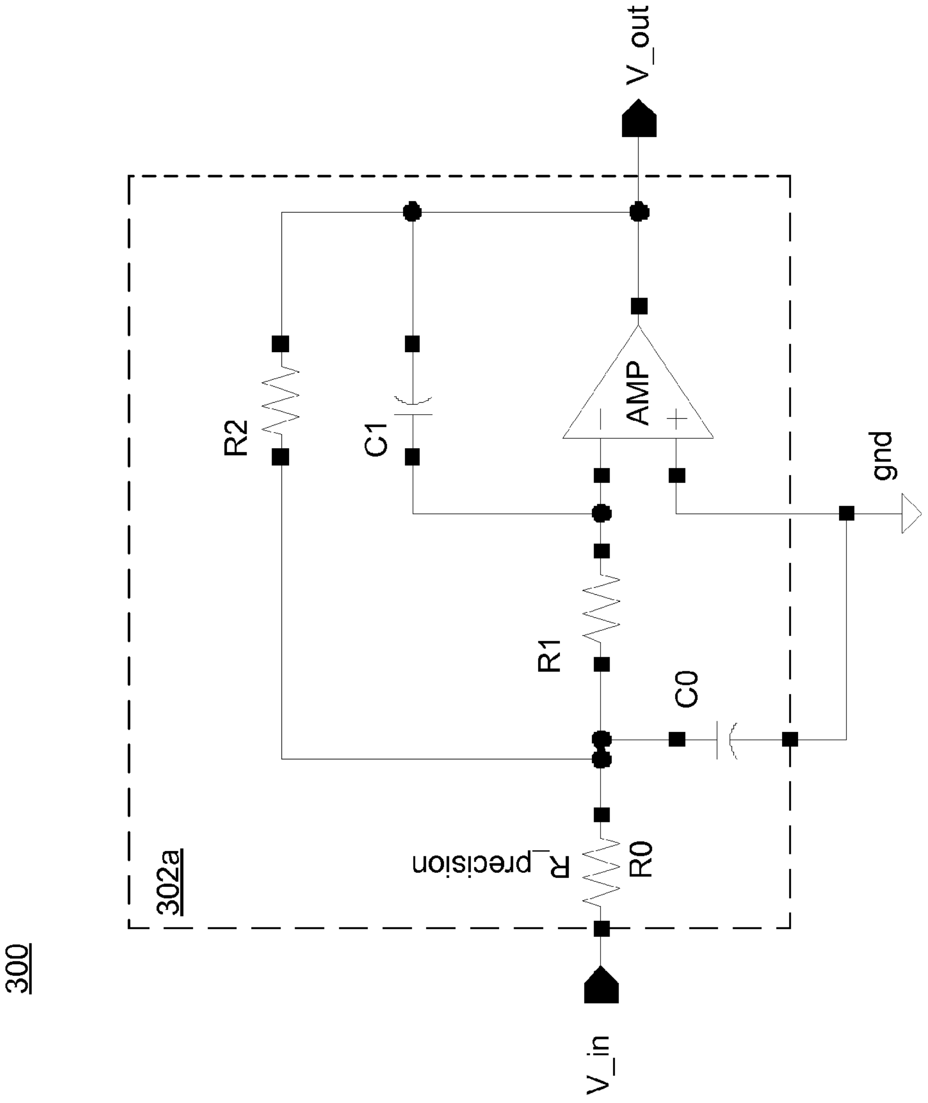
FIG. 3A illustrates an amplifier with a second order infinite gain topology filter in accordance with an embodiment of the present invention.

Specific embodiments of the present invention are directed to a voltage-to-current converter circuit configured to accept a reference voltage (Vref) and produce a precision reference current (Idc) for a load (Z_Load). Referring to FIG. 3C, in accordance with an embodiment, the voltage-to-current (V-I) converter circuit includes an amplifier (AMP) including a non-inverting (+) input, an inverting (−) input and an output. The V-I converter circuit also includes a transistor (M1) including a control terminal (gate or base), a first current path terminal (source or emitter) and a second current path terminal (drain or collector), with a current path between the first and second current path terminals, wherein the control terminal (gate or base) of the transistor (M1) is driven by the output of the amplifier (AMP). Additionally, the V-I converter circuit includes a first capacitor (C1), a first resistor (R1) and a second resistor (R2). The first capacitor (C1) is connected between the inverting (−) input of the amplifier and the first current path terminal (source or emitter) of the transistor (M1). The first resistor (R1) includes a first terminal connected to the inverting (−) input of the amplifier (AMP). The second resistor (R2) includes a first terminal connected to the first current path terminal (source or emitter) of the transistor (M1), and the second terminal connected to the second terminal of the first resistor (R1). The precision reference current (Idc) is produced at the second current path terminal (drain or collector) of the transistor (M1). In accordance with an embodiment, the V-I converter circuit also includes a third resistor (R0) connected between the second terminal of the second resistor (R2) and a low voltage rail (e.g., ground), and a second capacitor (C0) connected in parallel with the third resistor (R0).

In an embodiment, the precision reference current (Idc), wherein Idc=Vref/R0, can be for use as a reference current by the load (Z_load), which is connected between the second current path terminal (drain or collector) of the transistor (M1) and a supply voltage (Vsupply).

In accordance with certain embodiments, the transistor (M1), the first capacitor (C1), the first resistor (R1) and the second resistor (R2) are located within a packaged integrated circuit (IC), with the second terminal of the second resistor (R2) being connected to a pin of the packaged IC. In such embodiments, the third resistor (R0) and the second capacitor (C0) are located external to the packaged IC. For example, the third resistor (R0) and the second capacitor (C0) can be located on a printed circuit board, and the packaged IC can be attached to that same printed circuit board. For another example, the packaged IC can be attached to a printed circuit board, and the third resistor (R0) can be located remote from the printed circuit board. In accordance with an embodiment, the first resistor (R1) and the second resistor (R2) are made of the same material so that they can be more readily matched to provide an accurate filter response.

The capacitor (C0) shunts noise that couples into the V-I converter. The first resistor (R1), the second resistor (R2) and the first capacitor (C1) decouple the second capacitor (C0) from a virtual ground of the amplifier (AMP). Explained another way, the first and second resistors (R1 and R2) and the first capacitor (C1) comprise a frequency dependent feedback network configured to compensate for instabilities introduced by the second capacitor (C0).

In accordance with an embodiment, the amplifier (AMP), the transistor (M1), the first and second capacitors (C1 and C0), and the first, second and third resistors (R1, R2 and R3) are configured as a filter having a second order infinite gain topology.

Embodiments of the present invention are also directed to methods for generating a reference current (Idc). In an embodiment, a voltage-to-current converter circuit is used to generate the reference current (Idc) in dependence on a reference voltage (Vref) and a precision resistor (R0), wherein Idc=Vref/R0. A capacitor (C0) is used to shunt noise that couples into the voltage-to-current converter. A frequency dependent feedback network is used to compensate for instabilities introduced by the capacitor (C0). The capacitor (C0) can be used to shunt noise that couples into the voltage-to-current converter by connecting the capacitor (C0) in parallel with the precision resistor (R0). The frequency dependent feedback network can be used to compensate for instabilities introduced by the capacitor (C0) by connecting the frequency dependent feedback network between a feedback terminal of an amplifier of the voltage-to-current converter circuit and a terminal of the capacitor (C0).

This summary is not intended to summarize all of the embodiments of the present invention. Further and alternative embodiments, and the features, aspects, and advantages of the embodiments of invention will become more apparent from the detailed description set forth below, the drawings and the claims.

DETAILED DESCRIPTION

As mentioned above, there is a need to reject the noise coupled into a package pin of an IC that includes a V-I converter. As also mentioned above, this is complicated by the fact that the coupled noise is indistinguishable from a change in the precision resistor, and the feedback of the amplifier forces all the current injected through the parasitic capacitance to flow into the load.

Figure 2:
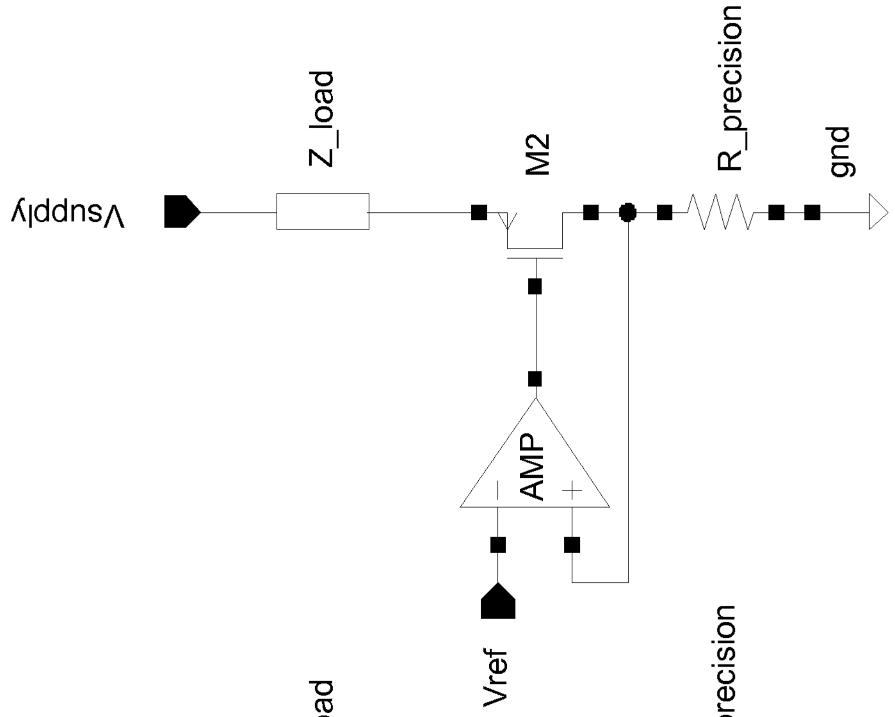
FIG. 2 (Prior Art)
FIG. 2 shows another exemplary prior art voltage-to-current converter circuit that can be used to generate a precision reference current.
Figure 1A:
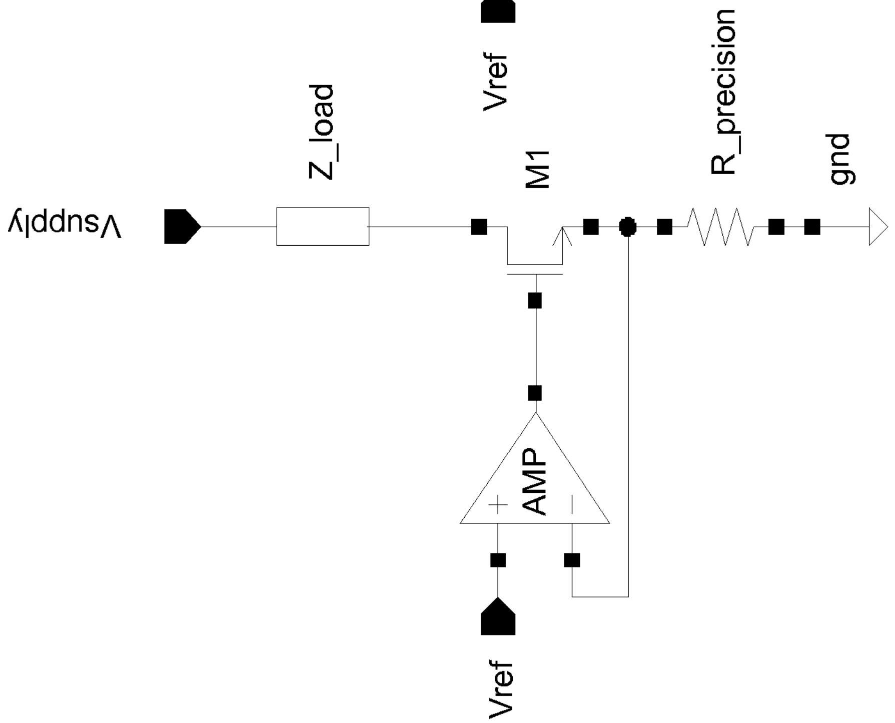
FIG. 1A (Prior Art)
FIG. 1A shows an exemplary prior art voltage-to-current converter circuit that can be used to generate a precision current reference.
Figure 1B:
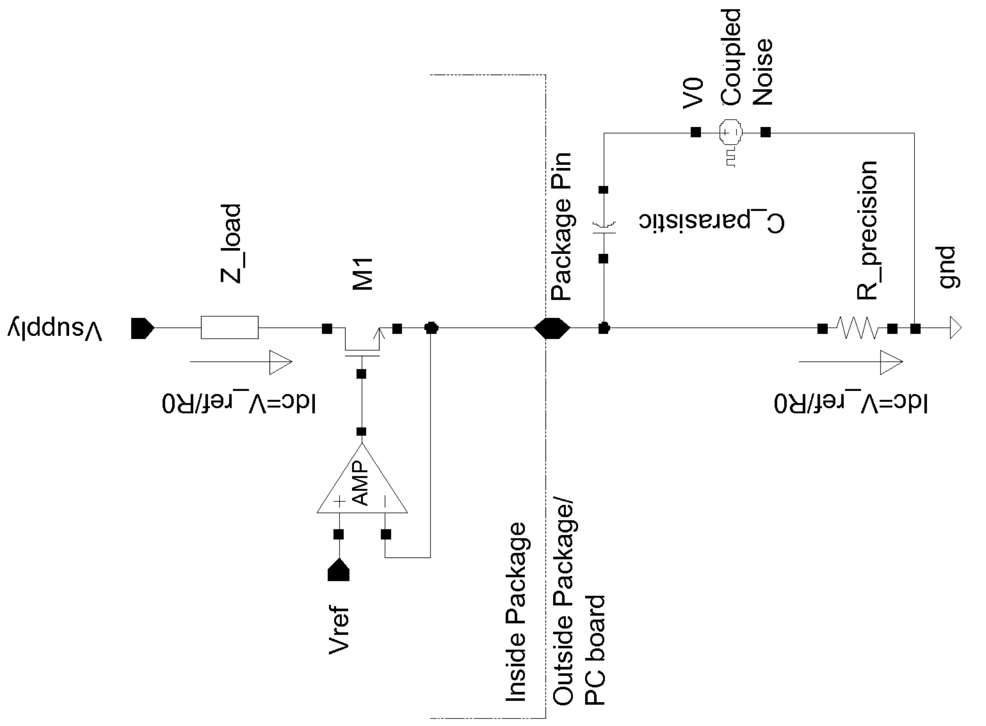
FIG. 1B illustrates the voltage-to-current converter circuit of FIG. 1A within an exemplary environment.
Figure 1C:
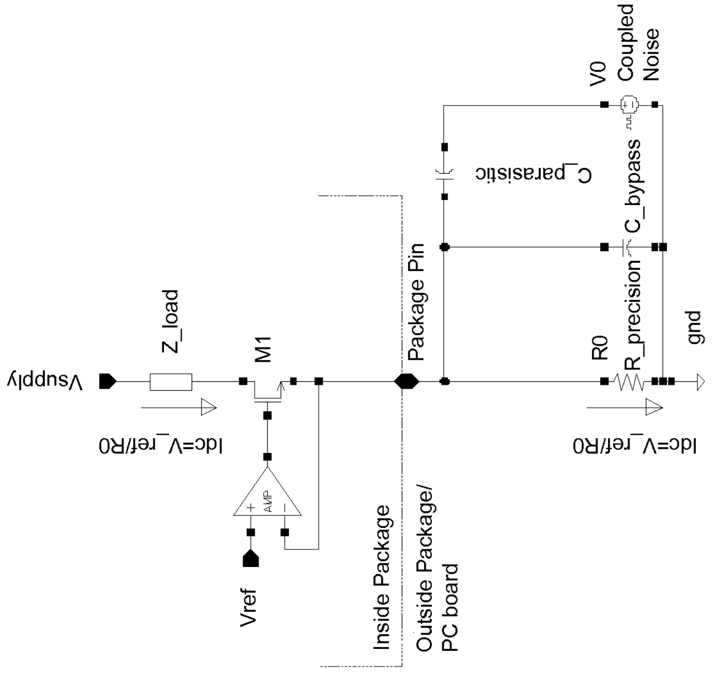
FIG. 1C illustrates the voltage-to-current converter circuit of FIG. 1A within the exemplary environment introduced in FIG. 1B, with a bypass capacitor connected in parallel with the off-chip precision resistor.

One way to attempt to make the V-I converter of FIG. 1A tolerant to injected noise would be to try to shunt the injected noise to ground with a bypass capacitor C_bypass in parallel with the precision resistor R_precision, as shown in FIG. 1C. However, assuming that the amplifier AMP operates as an ideal operation-amplifier (Op-Amp), all of the injected noise still flows through the transistor M1 into the load Z_Load because the source of the transistor M1 is the virtual ground node of the Op-Amp. Accordingly, in essence any capacitance tied to ground from that node (i.e., the virtual ground node of the Op-Amp) isn't seen by the circuit. Even worse, if the amplifier AMP operates as a non-ideal Op-Amp, adding a capacitor at the source of the transistor M1 degrades the phase margin of the circuit and limits the size of the capacitor, and also amplifies any high frequency noise coming from Vref.

This shows that a secondary problem exists, in that any bypass capacitor C_bypass placed in parallel with the precision resistor R_precision leads to phase margin problems in the V-I converter. In order to solve both the noise injection problem and the phase margin problem, two things should happen: first, the coupled noise should not couple into the virtual ground node of the amplifier AMP; and secondly, the phase margin of the system should be de-coupled from the bypass capacitor C_bypass added to shunt the coupled noise to ground.

In accordance with an embodiment of the present invention, the above described coupling and stability problems are overcome by the use of a standard circuit in a non-standard way. Referring to FIG. 3A, a second order infinite gain topology filter 302*a* is shown, which has a second order low-pass transfer function from the voltage input (V_in) to the voltage output (V_out) as given by Equation 1.

$$\text{V\_out}(s) = \frac{-\text{V\_in} * R2}{(R0 * R1 * R2 * C0 * C1) * s^2 + (R0 * R1 + R0 * R2 + R1 * R2) * C1 * s + R0} \qquad \text{EQUATION 1}$$

In FIG. 3A, the filter 302*a* includes capacitors C0 and C1, resistors R0, R1 and R2 and an amplifier AMP. However this filter 302*a* has a transfer function that is voltage in to voltage out, and the V-I converter has a transfer function that is voltage in to current out. The reference input to a V-I converter has its input connected to the non-inverting input of the amplifier AMP (e.g., an Op-Amp), whereas the filter 302*a* here does not. Furthermore, the current which flows in the output of the amplifier AMP (e.g., an Op-Amp) does not have a second order low pass transfer function. Rather, the transfer function for a signal injected from a coupled noise source (modeled as V0) is shown by Equation 2.

$$I\_out(s) = \frac{-V0 * C\_par * R0 * s * (1 + (C1 * R1 + C1 * R2) * s)}{((C\_par * R0 * R1 * R2 * C1 + R0 * R1 * R2 * C0 * C1) * s^2 + (R0 * R1 + R0 * R2 + R1 * R2) * C1 * s + R0)} \quad \text{EQUATION 2}$$

In Equations 1 and 2, s is a complex variable which corresponds to frequency when a time domain function is mapped into the frequency domain by use of a Laplace transform. With regards to the transfer function of Equation 2, this transfer function has both a second order numerator and a second order denominator. One may expect to have a zero due to the capacitive coupling of the signal into the circuit through the parasitic capacitance C2 (also referred to as C_parasitic), and another zero due to the current which flows into the output through the capacitor C1. However, viewing this transfer function does not directly show how this topology helps with the coupling. In fact, the zeros could possibly couple the noise directly to the output, and as it turns out, to some extent they do.

This topology has two things going for it, which can be used to solve the coupling and stability problems mentioned earlier. First, the stability of the system is determined primarily by the choice of the feedback components C1, R1 and R2. These can be adjusted to guarantee stability for a given R0 and C0, and not the amplifier AMP itself, meaning that the capacitor C0 to ground can be made arbitrarily large within the bounds of building a regular second order filter. Second, the capacitor C0 does not sit directly on the virtual ground of the amplifier, which is part of why the stability of the system is somewhat decoupled from the choice of the capacitor C0, and is also part of the reason that this topology solves the coupling problem, as will be shown in more detail below.

Figure 3B:
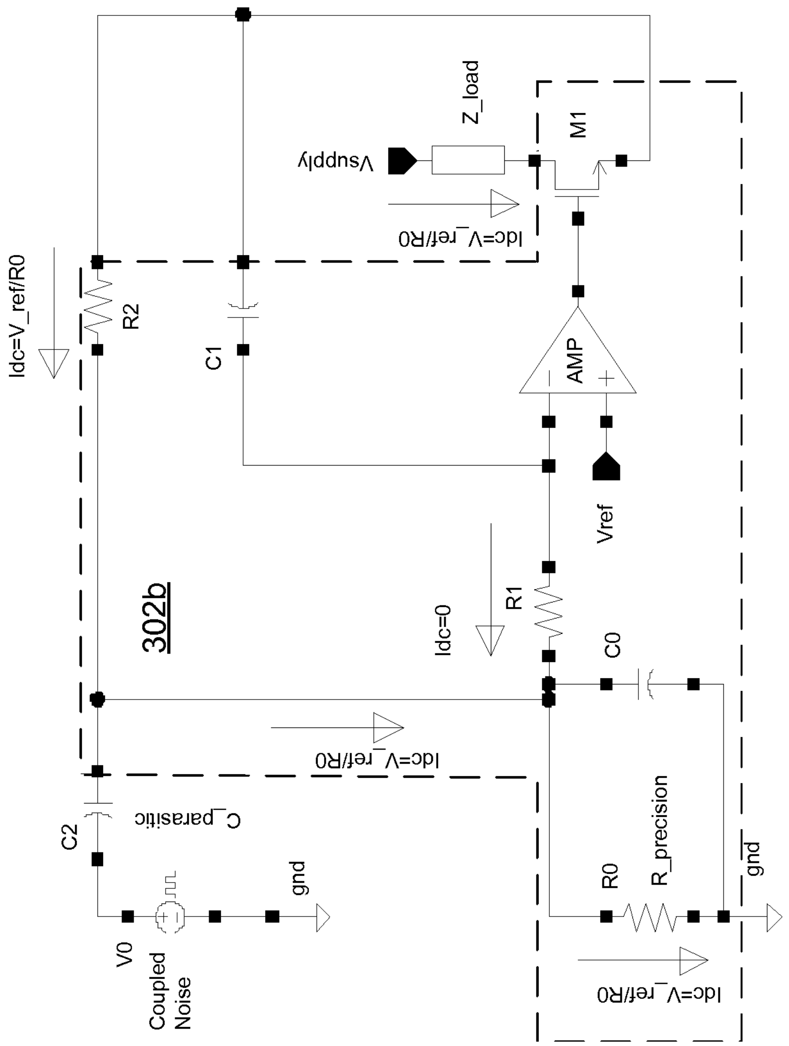
FIG. 3B illustrates a voltage-to-current converter circuit including an infinite gain second order filter in accordance with an embodiment of the present invention.
Figure 3C:
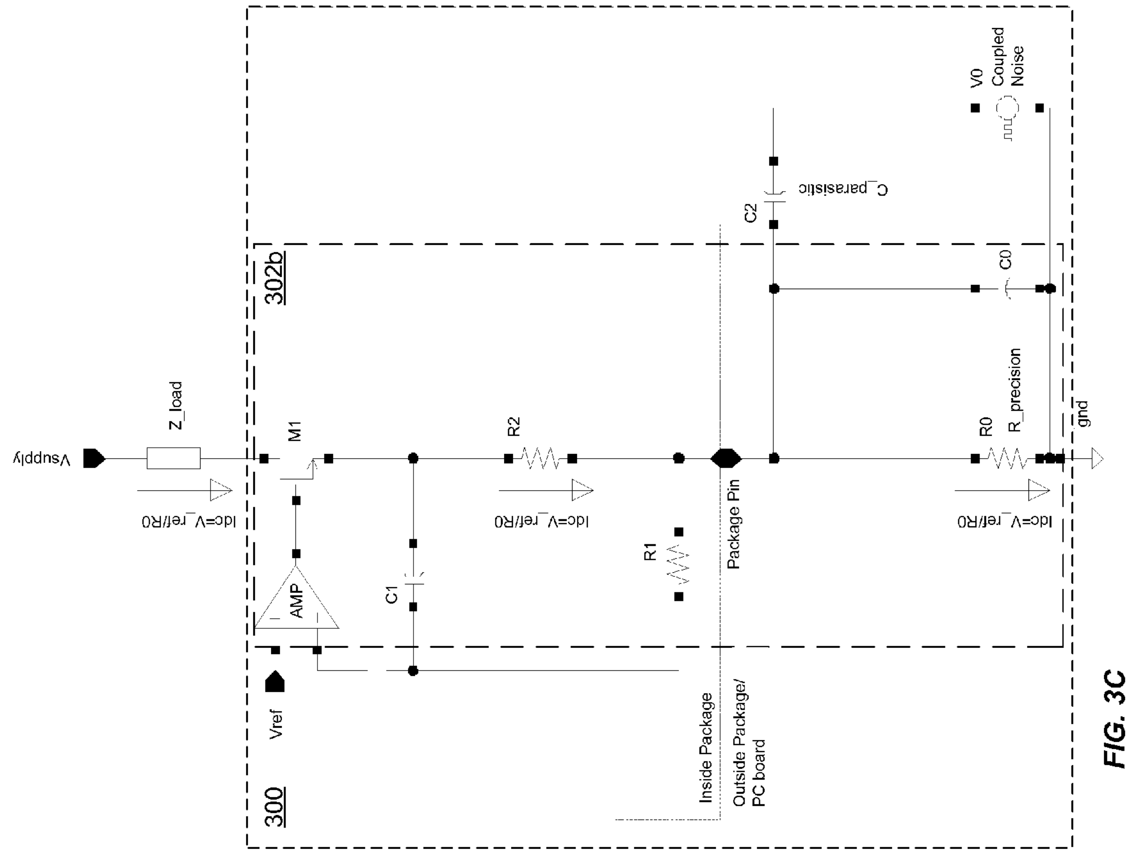
FIG. 3C illustrates a voltage-to-current converter circuit including an infinite gain second order filter in accordance with an embodiment of the present invention.

To use this topology for voltage-to-current conversion, in accordance with an embodiment of the present invention, a redrawn version is shown in FIG. 3B. Referring to FIG. 3B, a voltage-to-current converter 300 is shown as including the second order infinite gain topology filter 302*b*. The filter 302*b* has its input grounded, and the reference voltage Vref is connected to the non-inverting (+) input of the amplifier AMP. As can be appreciated using elementary circuit analysis, the DC current which flows in the load Z_Load is Vref/R0, as was the case in the circuits of FIGS. 1A and 1B. The DC current is also independent of the resistors R1 and R2, and independent of the capacitors C0 and C1, leaving the reference voltage Vref just as accurate as in the prior art V-I circuits of FIGS. 1A and 1B.

FIG. 3C shows the same topology of FIG. 3B, with the IC package and pin included in a way that makes more sense as a V-I converter, rather than as a filter. As was stated earlier, the transfer function from the injected noise to the output is not a second order low pass filter response. Rather, it is more complicated with multiple poles and zeros. The parasitic capacitance C2 is also shown coupling into the package pin. Despite the use of the second order filter topology, it is not the filter itself that is providing the bulk of the rejection of the coupled noise. The rejection is provided by the capacitor divider circuit formed by the parasitic capacitance C2 and the capacitor C0. In FIGS. 3C (and 3B), the capacitor C0 is a bypass capacitor connected in parallel with the precision resistor R0. Because the capacitor C0 does not sit on the virtual ground node of the amplifier AMP, the capacitor C0 can be made much larger than any parasitic capacitance C2 that could couple into the circuit, and thus attenuates the magnitude of the noise pulse coupled in by the ratio of C2 to C0. The noise rejection is roughly the ratio of C2/(C0+C2). Accordingly, C0 should be larger than C2 by an amount which provides the desired noise rejection.

A way to explain the functionality of the circuit is as follows. Assume a fast dV/dT step occurs on the noise generator, where fast implies that the dV/dT is at least 5× faster than the time constants in the filter itself. At steady state, the voltage across the capacitor C0 is equal to the reference voltage Vref. The fast step on the noise generator (modeled as V0) causes the voltage across the capacitor C0 to move by an amount equal to the voltage division between the parasitic capacitance C2 and the bypass capacitor C0. This change in voltage across the precision resistor R0 causes its current to change accordingly, and to maintain Kirchhoff's current law the output current changes by the same amount in the opposite direction. The current step magnitude at the output is given by Equation 3.

$$\Delta I\_out = -\Delta V0 * \frac{C\_par}{C0 + C\_par} * \left(\frac{1}{R1} + \frac{1}{R2}\right) \quad \text{EQUATION 3}$$

Following the step on V0, the circuit recovers with the regular second order filter response determined by the Laplace domain transfer function of Equation 1.

In summary, certain embodiments of the present invention relate to a new topology for a precision current reference which is tolerant to coupling of external noise. In accordance with an embodiment, the circuit makes use of a standard active second order filter topology in a non-standard way. In accordance with an embodiment, by building the current reference as part of a second order filter, an external current setting resister (R_precision) can be used with a large bypass capacitor (C0) to accurately set the current and reject any coupling from a PC board onto the current setting resistor pin without degrading the accuracy of the reference and maintaining high PSRR.

Precision current reference circuits of specific embodiments of the present invention provide for high power supply rejection and high accuracy with only one package pin needed. Additionally, current reference circuits of specific embodiments of the present invention can also provide a DC current output that is insensitive to internal passive components. Further, current reference circuits of embodiments of the present invention can provide a high rejection to coupling from adjacent pins and/or circuit board traces. Stability of specific embodiments of the present invention is decoupled from the stability of the amplifier, and stability of the circuit is determined by well known active filter design analysis. Additionally, current reference circuits of specific embodiments of the present invention provide for recovery from injected noise that can be determined by a second order filter characteristic. Further, with current reference circuits of specific embodiments of the present invention, an arbitrarily large bypass capacitor can be used without affecting amplifier stability.

Precision current reference circuits of specific embodiments of the present invention can be used to provide precision current references to various types of circuits, including, but not limited to, pulse width modulators (PWMs), switch mode power supplies (SMPSs), other types of power supplies, digital-to-analog converters (DACs), analog to digital converters (ADCs), audio amplifiers (such as, but not limited to Class-D amplifiers), low drop out (LDOs) regulators, and other voltage regulators.

In FIGS. 3B and 3C, the transistor M1 of the V-I converter 300 was shown as being a metal oxide semiconductor field-effect transistor (MOSFET). However, the transistor M1 can be replaced with other types of transistors, including, but not limited to, a junction field-effect transistor (JFET), an insulated gate bipolar transistor (IGBT), or a bipolar junction transistor (BJT), while still being within the scope of the present invention.

In FIGS. 3B and 3C, one of the terminals of the precision resistor R0 and one of the terminals of the capacitor C0 were shown as being connected to ground. However, it is also within the scope of the present invention that these terminals of the precision resistor R0 and the capacitor C0 be connected to an alternative low voltage rail.

In FIGS. 3B and 3C, the packaged IC, the precision resistor R0 and the capacitor C0 were all shown as being attached to the same PC board. However, that need not be the case. For one example, it is possible that the precision resistor R0 (and also the capacitor C0) be placed remotely and used for some sort of remote sensing, in which case the precision resistor R0 may not be located on the same PC board to which the packaged IC is attached. For example, the resistor R0 could be a thermistor used to measure temperature inside an oven, and the rest of the circuit could be outside the oven so that it does not operate at high temperatures. This is just one example that is not meant to be limiting.

Figure 4:
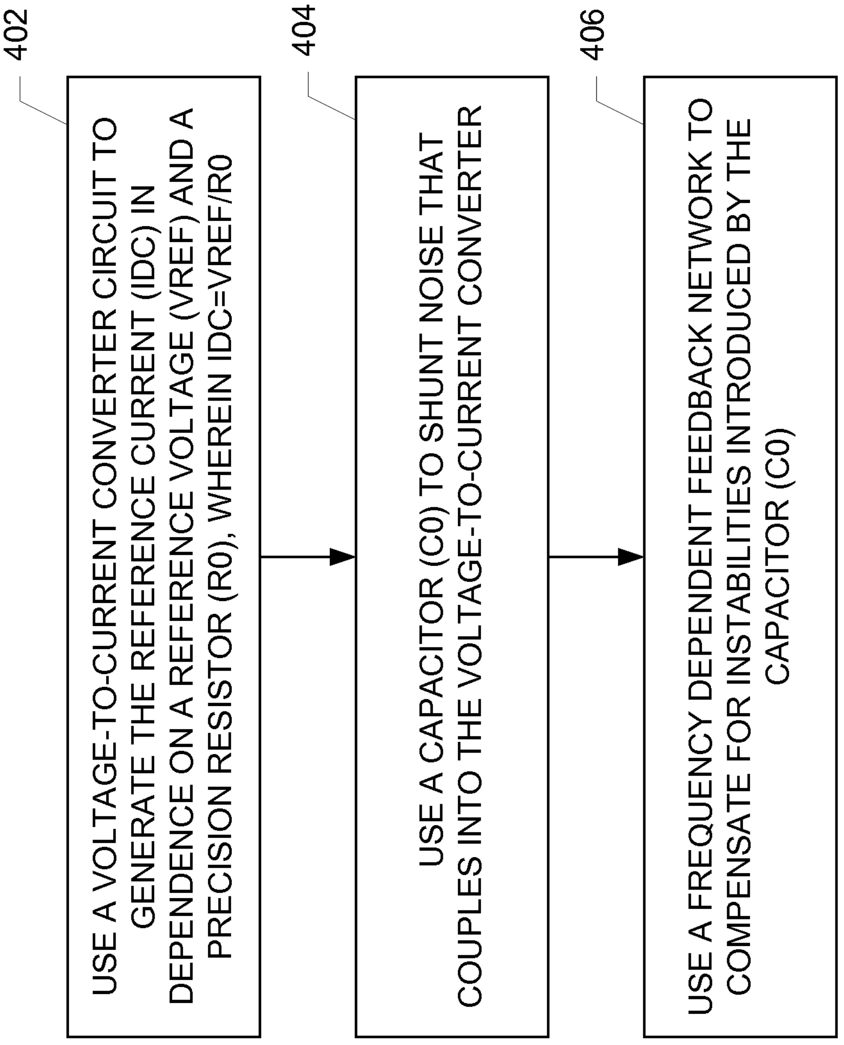
FIG. 4 is a high level flow diagram that is used to summarize methods of embodiments of the present invention.

Methods of embodiments of the present invention are summarized with reference to FIG. 4. In an embodiment, a voltage-to-current converter circuit is used to generate the reference current (Idc) in dependence on a reference voltage (Vref) and a precision resistor (R0), wherein Idc=Vref/R0, as indicated at step 402. As indicated at step 404, a capacitor (C0) is used to shunt noise that couples into the voltage-to-current converter. As indicated at step 406, a frequency dependent feedback network is used to compensate for instabilities introduced by the capacitor (C0). At step 404, the capacitor (C0) can be used to shunt noise that couples into the voltage-to-current converter by connecting the capacitor (C0) in parallel with the precision resistor (R0). At step 406, the frequency dependent feedback network can be used to compensate for instabilities introduced by the capacitor (C0) by connecting the frequency dependent feedback network between a feedback terminal of an amplifier of the voltage-to-current converter circuit and a terminal of the capacitor (C0). Additional details of such methods can be appreciated from the discussion of FIGS. 3A-3C above.

The foregoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. Slight modifications and variations are believed to be within the spirit and scope of the present invention. It is intended that the scope of the invention be defined by the following claims and their equivalents.

What is claimed is:

1. A voltage-to-current converter circuit configured to accept a reference voltage (Vref) and produce a precision reference current (Idc) for a load (Z_Load), the voltage-to-current circuit comprising:

an amplifier (AMP) including a non-inverting (+) input, an inverting (−) input and an output;

a transistor (M1) including a control terminal (gate or base), a first current path terminal (source or emitter) and a second current path terminal (drain or collector), with a current path between the first and second current path terminals, wherein the control terminal (gate or base) of the transistor (M1) is driven by the output of the amplifier (AMP);

a first capacitor (C1) connected between the inverting (−) input of the amplifier and the first current path terminal (source or emitter) of the transistor (M1);

a first resistor (R1) including a first terminal and a second terminal, wherein the first terminal of the first resistor (R1) is connected to the inverting (−) input of the amplifier (AMP); and a second resistor (R2) including a first terminal and a second terminal, wherein the first terminal of the second resistor (R2) is connected to the first current path terminal (source or emitter) of the transistor (M1), and the second terminal of the second resistor (R2) is connected to the second terminal of the first resistor (R1);

wherein the precision reference current (Idc) is produced at the second current path terminal (drain or collector) of the transistor (M1).

2. The voltage-to-current converter circuit of claim 1, further comprising:

a third resistor (R0) connected between the second terminal of the second resistor (R2) and a low voltage rail; and a second capacitor (C0) connected in parallel with the third resistor (R0).

3. The voltage-to-current converter circuit of claim 2, wherein Idc=Vref/R0.

4. The voltage-to-current converter circuit of claim 2, wherein the low voltage rail is ground.

5. The voltage-to-current converter circuit of claim 2, wherein:

the transistor (M1), the first capacitor (C1), the first resistor (R1) and the second resistor (R2) are located within a packaged integrated circuit (IC), with the second terminal of the second resistor being connected to a pin of the packaged IC; and the third resistor (R0) and the second capacitor (C0) are located external to the packaged IC.

6. The voltage-to-current converter circuit of claim 5, wherein:

the third resistor (R0) and the second capacitor (C0) are located on a printed circuit board.

7. The voltage-to-current converter circuit of claim 6, wherein:

the packaged IC is attached to the printed circuit board.

8. The voltage-to-current converter circuit of claim 5, wherein:

the packaged IC is attached to a printed circuit board; and the third resistor (R0) is located remote from the printed circuit board.

9. The voltage-to-current converter circuit of claim 2, wherein the first resistor (R1), the second resistor (R2) and the first capacitor (C1) decouple the second capacitor (C0) from a virtual ground of the amplifier (AMP).

10. The voltage-to-current converter circuit of claim 2, wherein the amplifier (AMP), the transistor (M1), the first and second capacitors (C1 and C0), and the first, second and third resistors (R1, R2 and R3) are configured as a filter having a second order infinite gain topology.

11. The voltage-to-current converter circuit of claim 2, wherein:

the second capacitor (C0) is adapted to shunt noise that couples into the voltage-to-current converter; and the first and second resistors (R1 and R2) and the first capacitor (C1) comprise a frequency dependent feedback network configured to compensate for instabilities introduced by the second capacitor (C0).

12. The voltage-to-current converter circuit of claim 2, wherein the precision reference current (Idc) is for use as a reference current by the load (Z_load), which is connected between the second current path terminal (drain or collector) of the transistor (M1) and a supply voltage (Vsupply).

13. The voltage-to-current converter circuit of claim 1, wherein the precision reference current (Idc) is for use as a reference current by the load (Z_load), which is connected between the second current path terminal (drain or collector) of the transistor (M1) and a supply voltage (Vsupply).

14. A voltage-to-current converter circuit configured to accept a reference voltage (Vref) and produce a precision reference current (Idc) for a load (Z_Load), the voltage-to-current circuit comprising:

an amplifier (AMP) including a non-inverting (+) input, an inverting (−) input and an output, wherein a reference voltage (Vref) is provided to the non-inverting (+) input;

a transistor (M1) including a control terminal (gate or base), a first current path terminal (source or emitter) and a second current path terminal (drain or collector), with a current path between the first and second current path terminals, wherein the control terminal of the transistor (M1) is driven by the output of the amplifier (AMP);

a precision resistor (R0) that together with the reference voltage (Vref) specifies a magnitude of the precision reference current (Idc) generated by the voltage-to-current converter, wherein Idc=Vref/R0;

a capacitor (C0) adapted to shunt noise that couples into the voltage-to-current converter; and a frequency dependent feedback network configured to compensate for instabilities introduced by the capacitor (C0).

15. The voltage-to-current converter circuit of claim 14, wherein the frequency dependent feedback network comprises:

a first capacitor (C1) connected between the inverting (−) input of the amplifier and the first current path terminal (source or emitter) of the transistor (M1);

a first resistor (R1) including a first terminal and a second terminal, wherein the first terminal of the first resistor (R1) is connected to the inverting (−) input of the amplifier (AMP); and a second resistor (R2) including a first terminal and a second terminal, wherein the first terminal of the second resistor (R2) is connected to the first current path terminal (source or emitter) of the transistor (M1), and the second terminal of the second resistor (R2) is connected to the second terminal of the first resistor (R1).

16. The voltage-to-current converter circuit of claim 14 wherein the precision reference current (Idc) is for use as a reference current by the load (Z_load), which is connected between the second current path terminal (drain or collector) of the transistor (M1) and a supply voltage (Vsupply).

17. A method for generating a reference current (Idc), comprising:

(a) generating a reference current (Idc) using a voltage-to-current converter circuit that includes an amplifier, wherein the generating the reference current (Idc) is performed in dependence on a reference voltage (Vref) and a precision resistor (R0);

(b) shunting noise that couples into the voltage-to-current converter and would otherwise affect the reference current (Idc), wherein the shunting noise is performed using a capacitor (C0) in parallel with the precision resistor (R0); and (c) compensating for instabilities introduced by the shunting step, wherein the compensating for instabilities is performed using a frequency dependent feedback network between a feedback terminal of the amplifier used at step (a) and a terminal of the capacitor (C0) used at step (b).

18. The method of claim 17, wherein:

step (c) includes using the frequency dependent feedback network to decouple the capacitor (C0) from a virtual ground of the amplifier of the voltage-to-current converter circuit.

19. A system, comprising:

circuitry that generates a reference current (Idc) in dependence on a reference voltage (Vref) and a precision resistor (R0), wherein Idc=Vref/R0, and wherein the circuitry that generates the reference current (Idc) includes an amplifier;

a capacitor (C0) that shunts noise that couples into the circuitry that generates the reference current (Idc), wherein the capacitor (C0) is connected in parallel with the precision resistor (R0); and a frequency dependent feedback network that compensates for instabilities introduced by the capacitor (C0), wherein the frequency dependent feedback network is connected between a feedback terminal of the amplifier and a terminal of the capacitor (C0), and wherein the frequency dependent feedback network decouples the capacitor (C0) from a virtual ground of the amplifier.

20. The system of claim 19, wherein:

the amplifier is located within a packaged integrated circuit (IC); and the capacitor (C0) and the precision resistor (R0) are located external to the packaged IC and are connected to a pin of the packaged IC.

* * * * *